United States Patent
Sugiura et al.

(10) Patent No.: US 9,604,402 B2
(45) Date of Patent: Mar. 28, 2017

(54) TRANSFER DEVICE AND MOLDED MATERIAL

(71) Applicant: Toshiba Kikai Kabushiki Kaisha, Tokyo (JP)

(72) Inventors: Yuki Sugiura, Mishima (JP); Mitsunori Kokubo, Numazu (JP); Isao Matsuzuki, Numazu (JP); Takato Baba, Mishima (JP); Toru Suzuki, Fuji (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 207 days.

(21) Appl. No.: 13/973,958

(22) Filed: Aug. 22, 2013

(65) Prior Publication Data

US 2014/0057079 A1 Feb. 27, 2014

(30) Foreign Application Priority Data

Aug. 23, 2012 (JP) ................ 2012-184222

(51) Int. Cl.
*B29C 59/04* (2006.01)

(52) U.S. Cl.
CPC ............ *B29C 59/043* (2013.01); *B29C 59/04* (2013.01); *B29C 59/046* (2013.01); *Y10T 428/24479* (2015.01)

(58) Field of Classification Search
CPC . B29C 2059/023; B29C 59/02; B29C 59/021; B29C 59/04; B29C 59/046; B29C 59/16; B29C 59/043; G03F 7/0002; B28Y 10/00; Y10T 428/24479
USPC .... 425/385, 383, 394, 397, 402, 403, 403.1, 425/392, 393; 428/98, 156; 264/500, 264/503, 555, 166, 209.2, 310, DIG. 68, 264/509
See application file for complete search history.

(56) References Cited

U.S. PATENT DOCUMENTS

| | | | |
|---|---|---|---|
| 2009/0315212 A1* | 12/2009 | Minoura | B29C 31/08 264/284 |
| 2010/0303947 A1* | 12/2010 | Mori | B29C 43/021 425/385 |
| 2013/0323347 A1 | 12/2013 | Itani et al. | |

FOREIGN PATENT DOCUMENTS

| | | |
|---|---|---|
| DE | 11 2011 103 391 T5 | 7/2013 |
| JP | 2009-196206 | 9/2009 |

(Continued)

OTHER PUBLICATIONS

B.J. Choi, et al., "Design of orientation states for step and flash imprint lithography", Precision Engineering Journal of the International Societies for Precision Engineering and Nanotechnology 25 (2001) 192-199.

(Continued)

*Primary Examiner* — Matthew Daniels
*Assistant Examiner* — Leith S Shafi
(74) *Attorney, Agent, or Firm* — DLA Piper LLP US (57) ABSTRACT

A transfer device includes a holding body that holds a molded material; a first roller that holds, together with the holding body, a wound mold and the molded material held by the holding body so as to carry out a transfer, and rotates about a central axis to move with respect to the holding body; and a second roller on which the mold extending from the first roller is wound in a direction away from the molded material held by the holding body, the second roller rotating about a central axis to relatively move together with the first roller.

11 Claims, 10 Drawing Sheets

(56) References Cited

FOREIGN PATENT DOCUMENTS

| | | | |
|---|---|---|---|
| JP | 2010-099882 | 5/2010 | |
| JP | 2010-137358 | 6/2010 | |
| JP | 2010-221561 | 7/2010 | |
| JP | 2010-280065 | 12/2010 | |
| JP | WO 2012046660 A1 * | 4/2012 | ........... B29C 31/006 |
| KR | 2020020015835 | 8/2002 | |
| TW | 200944363 | 11/2009 | |

OTHER PUBLICATIONS

English Language Abstract of JP 2010-280065 published Dec. 16, 2010.

Englosh Language Translation os JP 2010-280065 published Dec. 16, 2010.

Korean Office Action issued in 10-2013-98400 on Aug. 12, 2014 with an English Language Translation.

English Language Abstract of KR 2020020015835 published on Aug. 13, 2002.

English Language Abstract of JP 2010-221561 published on Oct. 7, 2010.

German Office Action issued in 10 2013 216 540.4 dated Jul. 14, 2014.

English Language Translation for German Office Action issued in 10 2013 216 540.4 dated Jul. 14, 2014.

Japanese Office Action issued in JP 2012-184222 dated Jan. 19, 2016 with English Language Translation.

English Language Translation and Abstract for JP 2009-196206 published Sep. 3, 2009.

Taiwanese Office Action issued in TW 102129805 dated Jan. 26, 2016 with English Language Translation.

English Language Translation and Abstract for JP 2010-099882 published May 6, 2010.

English Language Translation and Abstract for TW 200944363 published Nov. 1, 2009.

English Language Translation and Abstract JP 2010-137358 published Jun. 24, 2010.

* cited by examiner

TRANSFER DEVICE AND MOLDED MATERIAL

BACKGROUND OF THE INVENTION

Field of the Invention

The present invention relates to a transfer device that transfers a fine transfer pattern, and a molded material on which the fine transfer pattern is aimed by the transfer.

Description of the Related Art

Research and development of a nanoimprint technology are being carried out, in which a fine or ultrafine transfer pattern is formed on a quartz substrate by electron beam lithography to prepare a mold, and the mold is pressed against a molded product at a predetermined pressure, so as to transfer the transfer pattern formed on the mold to the molded product.

Figure 13:
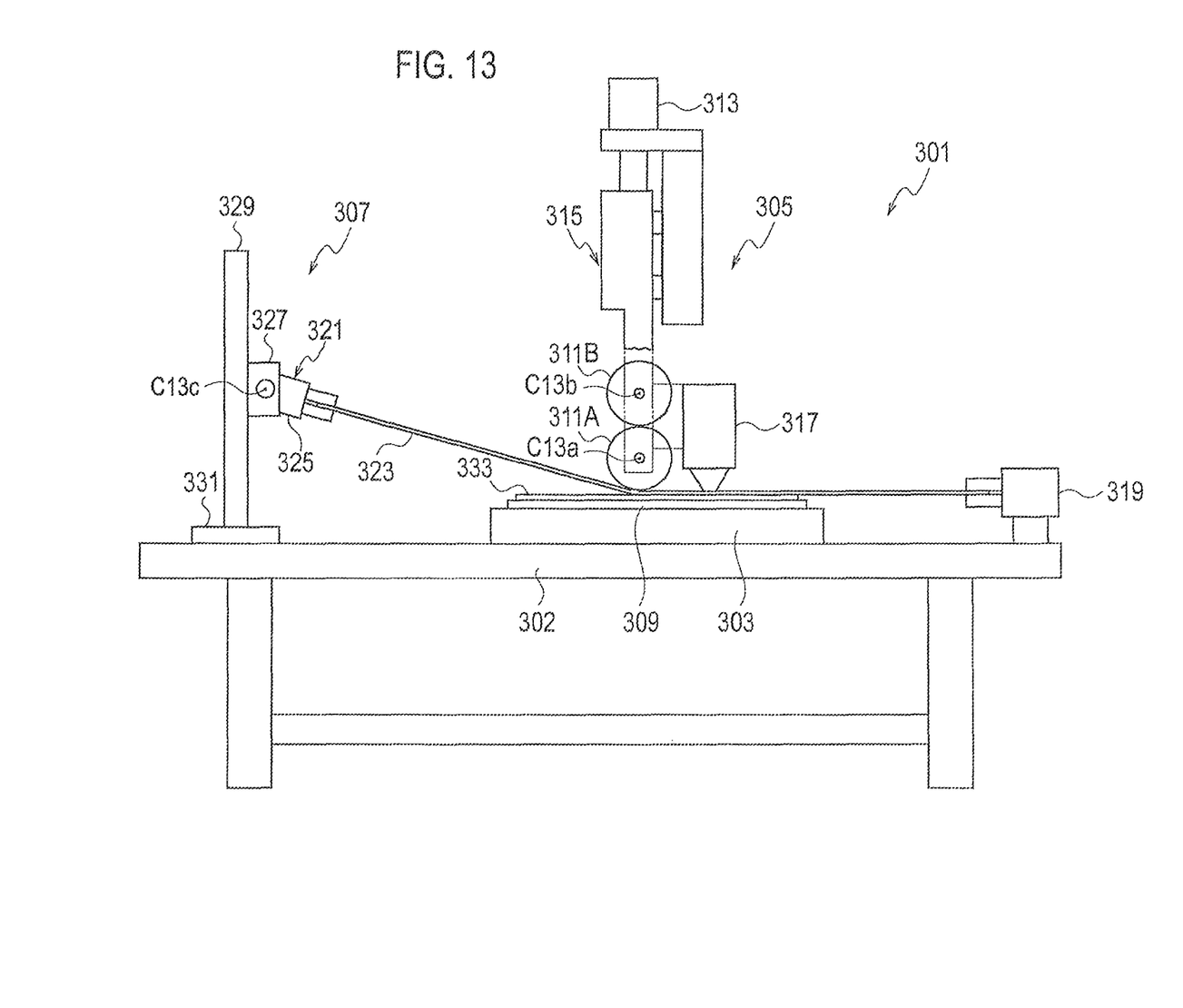
FIG. 13 shows a conventional transfer device.

There is known a transfer device 301 as shown in FIG. 13. The transfer device 301 includes a vibration isolator 302, a base (a substrate holding chuck) 303, a transfer unit 305 and a mold support unit 307.

The base 303 is integrally provided on the vibration isolator 302 to hold a plate-like molded material 309 by, for example, vacuum suction.

The transfer unit 305 includes a pair of rollers 311A and 311B that rotate, by way of a servomotor (not shown in the figure), about central axes C13a and C13b extending in the direction perpendicular to the plane of paper of FIG. 13, a roller drive unit 315 that vertically moves and positions the pair of rollers 311A and 311B by way of a servomotor 313, and an ultraviolet ray generation unit 317. The roller 311B is a backup roller.

The transfer unit 305 (the pair of rollers 311A and 311B and the ultraviolet ray generation unit 317) is configured to be movable to be placed in any position on the vibration isolator 302 by way of a drive unit including a servomotor (not shown in the figure) in the horizontal direction (in the right-left direction in FIG. 13).

The mold support unit 307 supports a mold 323. The mold 323 is formed into a thin plate-like shape, and is provided with a fine transfer pattern (not shown in the figure) formed on one surface in the thickness direction (in FIG. 13, the lower surface of the mold 323).

The mold support unit 307 includes a first chuck 319 and a second chuck 321.

The first chuck (the mold holding body) 319 is located on one side (on the right side in FIG. 13) of the upper surface of the vibration isolator 302 and separated from one end (the right end in FIG. 13) of the base 303. The first chuck 319 holds one end (the right end in FIG. 13) of the mold 323.

The second chuck 321 is located on the other side (on the left side in FIG. 13) above the upper surface of the vibration isolator 302 and separated from the other end (the left end in FIG. 13) of the base 303. The second chuck 321 includes a mold holding body 325, a rotation support body 327, a pillar 329 and a pillar support body 331.

The mold holding body 325 holds the other end of the mold 323. The rotation support body 327 supports the mold holding body 325. The mold holding body 325 supported by the rotation support body 327 rotates about its central axis C13c extending in the direction perpendicular to the plane of paper of FIG. 13 together with the rotation support body 327.

The pillar 329 supports the rotation support body 327. The rotation support body 327 is moved and positioned on the pillar 329 in the vertical direction by a servomotor (not shown in the figure).

The pillar 329 is integrally provided on the pillar support body 331. The pillar support body 331 is moved and positioned on the vibration isolator 302 by a servomotor (not shown in the figure) in the horizontal direction (in the right-left direction in FIG. 13).

Next, the case where a fine transfer pattern of the mold 323 is transferred to the molded material 309 in the transfer device 301 is explained below.

Figure 14:
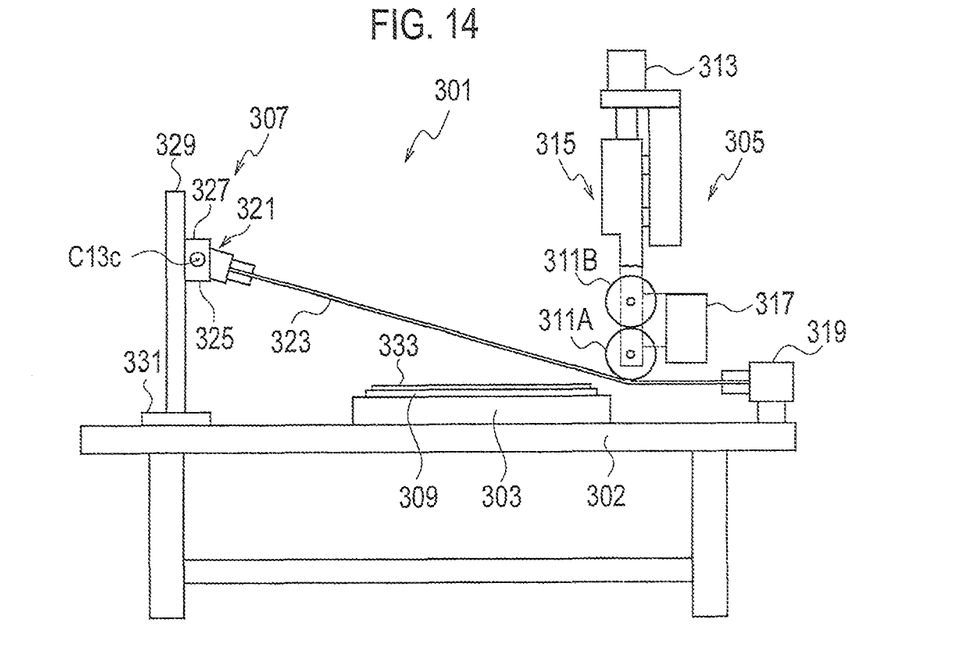
FIG. 14 shows a conventional transfer device.

In the initial state, as shown in FIG. 14, the mold 323 is supported by the mold support unit 307. The molded material 309 is placed on the base 303. The respective rollers 311A and 311B are located towards the right and separated from the right edge of the base 303.

In the initial state, the intermediate part of the mold 323 in the right-left direction is wound on the lower portion of the roller 311A. The distance between the lower portion of the roller 311A and the upper surface of the base 303 in the vertical direction, is set to approximately the sum of the thickness of the mold 323 and the thickness of the molded material 309.

In the initial state, the mold 323 extends from the first chuck 319 to the roller 311A in the horizontal direction, and further extends obliquely upward between the roller 311A and the second chuck 321.

Figure 15:
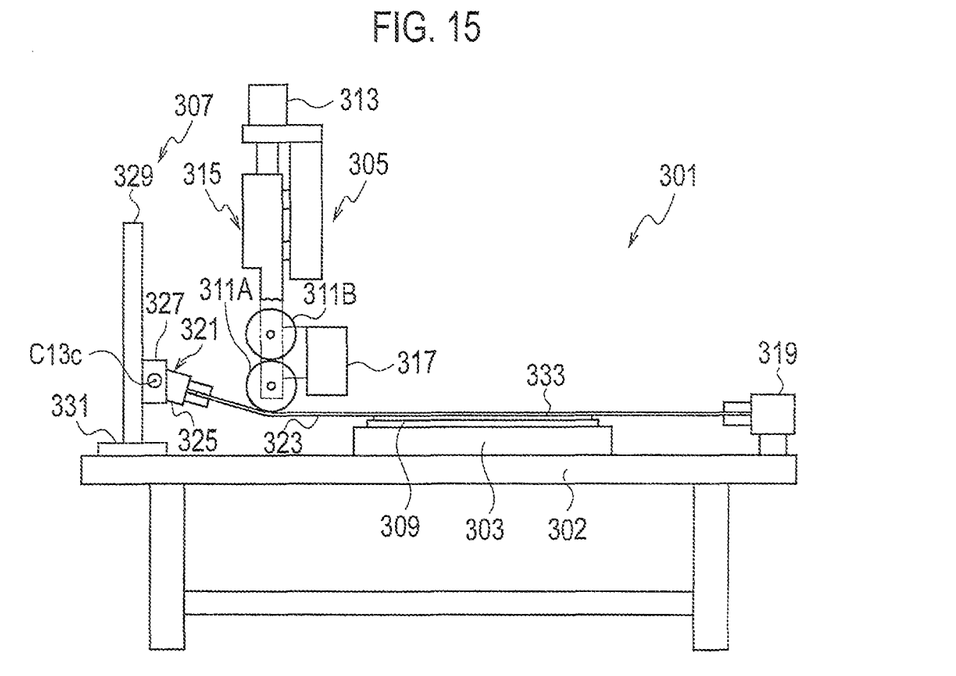
FIG. 15 shows a conventional transfer device.

In the initial state, the mold 323 is stretched tight at a predetermined tension. The mold 323 has a predetermined width in the direction perpendicular to the plane of paper of FIG. 14 (FIG. 13, FIG. 15). The mold 323 is not in contact with the molded material 309 placed on the base 303.

From the position in the initial state, the transfer unit 305 moves towards the left in FIG. 14 (together with the respective rollers 311A and 311B and the ultraviolet ray generation unit 317). The roller 311A then holds and presses the molded material 309 and the mold 323 in association with the base 303. The ultraviolet ray generation unit 317 irradiates the molded material 309 pressed by the roller 311A with ultraviolet rays and cures ultraviolet curable resin 333 of the molded material 309. As a result, a fine transfer pattern formed on the mold 323 is transferred to the molded material 309.

After the transfer, as shown in FIG. 15, the transfer unit 305 (the respective rollers 311A and 311B and the ultraviolet ray generation unit 317) is located towards the left and separated from the left edge of the base 303.

While the transfer unit 305 moves from the position of FIG. 14 to the position of FIG. 15, the configuration of the mold 323 is changed. The rotation support body 327 keeps the tension of the mold 323 at a predetermined level in association with the change in state of the mold 323, so as to prevent looseness of the mold 323. In particular, the rotation support body 327 is moved and positioned on the pillar 329 in the vertical direction, and the pillar support body 331 is moved and positioned on the vibration isolator 302 in the right-left direction.

Here, this kind of device and techniques described above are disclosed in Japanese Unexamined Patent Application Publication No. 2010-280065, and Precision Engineering Journal of the International Societies for Precision Engineering and Nanotechnology 25 (2001) 192-199.

SUMMARY OF THE INVENTION

In the conventional transfer device 301, when the transfer unit 305 moves from the right to the left on the base 303, the roller 311A (the roller 311B) rotates in synchronization with the rate of movement of the transfer unit 305, so as to prevent a relative slip between the roller 311A and the mold 323.

In addition to the synchronization movement, the rotation support body 327 is moved and positioned on the pillar 329 in the vertical direction, and the pillar support body 331 is moved and positioned on the vibration isolator 302 in the right-left direction, so as to prevent looseness of the mold 323. However, such a configuration complicates the control operation of the transfer device 301 because the number of objects to be synchronized is high.

The present invention has been accomplished in view of the conventional problem. It is an object of the present invention to provide a transfer device, which transfers a fine transfer pattern formed on a sheet-like mold to a molded material, capable of simplifying the control operation.

A first aspect of the present invention provides a transfer device that transfers a fine transfer pattern formed on a sheet-like mold to a molded material, the transfer device comprising: a holding body that holds the molded material; a first roller on which the mold is wound, the first roller holding, together with the holding body, the mold and the molded material held by the holding body, and the first roller rotating about a central axis thereof to move with respect to the holding body to carry out a transfer; and a second roller on which the mold extending from the first roller is wound in a direction away from the molded material held by the holding body, the second roller rotating about a central axis thereof to move with respect to the holding body together with the first roller.

The transfer device may include a master mold placement unit and a mold winding unit. The mold wound on the respective rollers may extend and be stretched out by a predetermined tension between a master mold placed on the master mold placement unit and the mold winding unit.

The second roller may be provided with a small diameter portion to avoid contact with the fine transfer pattern of the mold wound thereon.

The mold wound on and extending from the respective rollers may be parallel to the surface on which the molded material is provided.

The transfer device may further include a third roller and a fourth roller. The mold may be wound on the third roller and the fourth roller. The third roller and the fourth roller may move together with the first roller and the second roller to remove the mold from the molded material after the mold has been adhered to the molded material by the transfer.

A second aspect of the present invention provides a molded material on which a fine transfer pattern is formed by use of the transfer device.

According to the present invention, the transfer device, which transfers the fine transfer pattern formed on the sheet-like mold to the molded material, can simplify the control operation.

DESCRIPTION OF THE EMBODIMENTS

Figure 1:
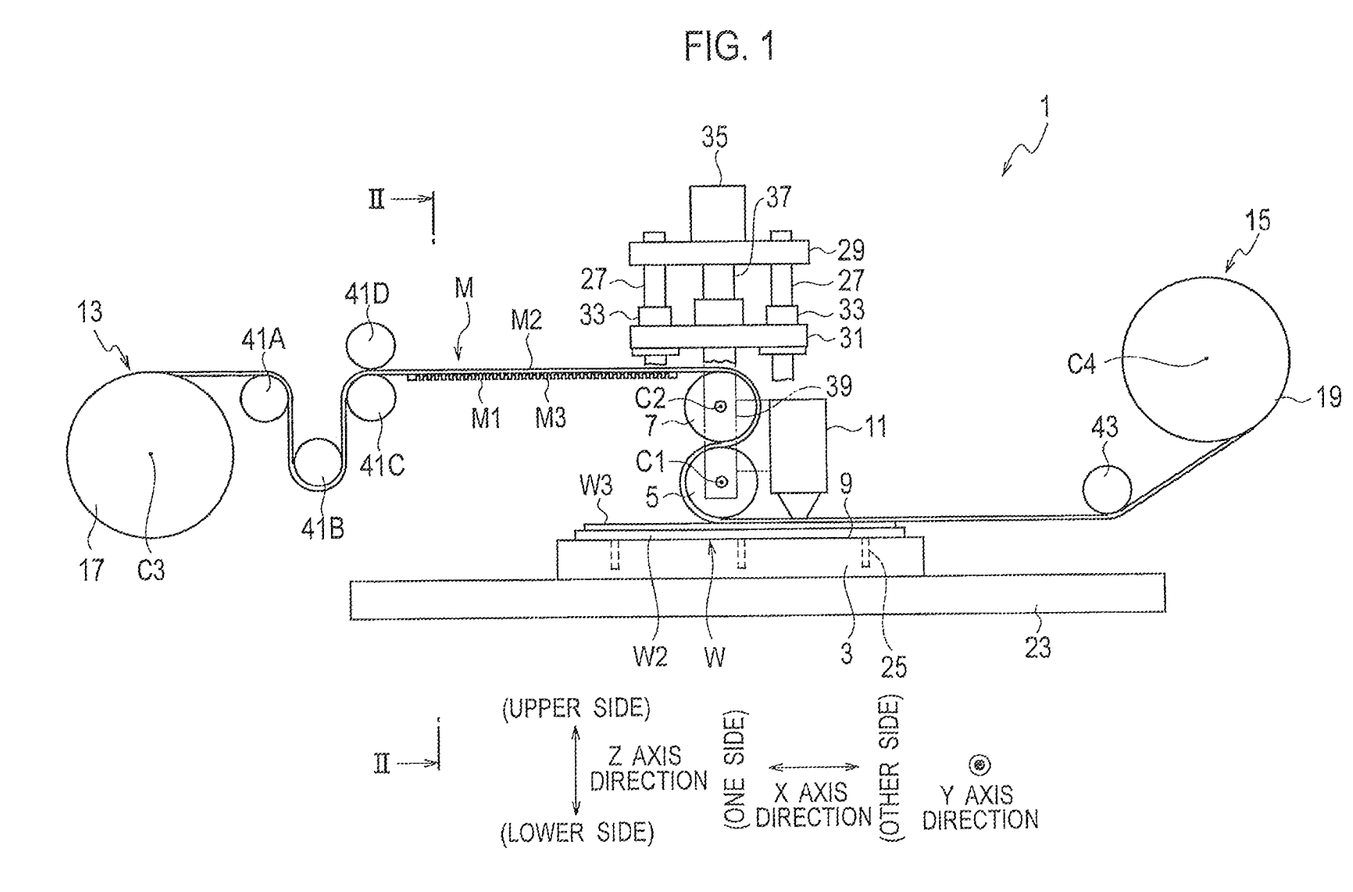
FIG. 1 shows a schematic configuration of a transfer device according to an embodiment of the present invention.

A transfer device 1 according to an embodiment of the present invention transfers, to a molded material W, a fine transfer pattern M1 formed on one surface of a sheet-like mold M in the thickness direction. As shown in FIG. 1, the transfer device 1 includes a holding body 3, a first roller 5 and a second roller 7.

Figure 7A:
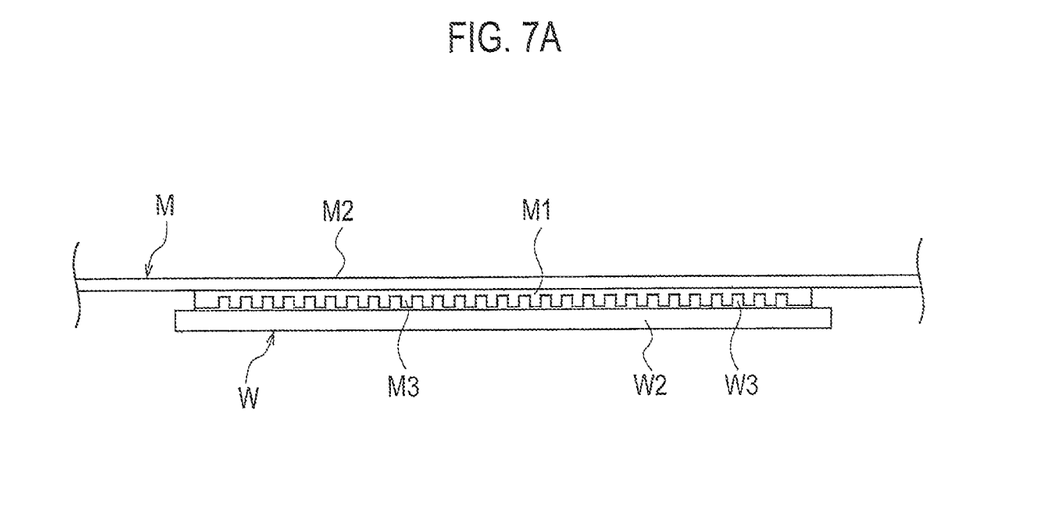
FIGS. 7A and 7B are explanatory views of a transfer state.
Figure 7B:
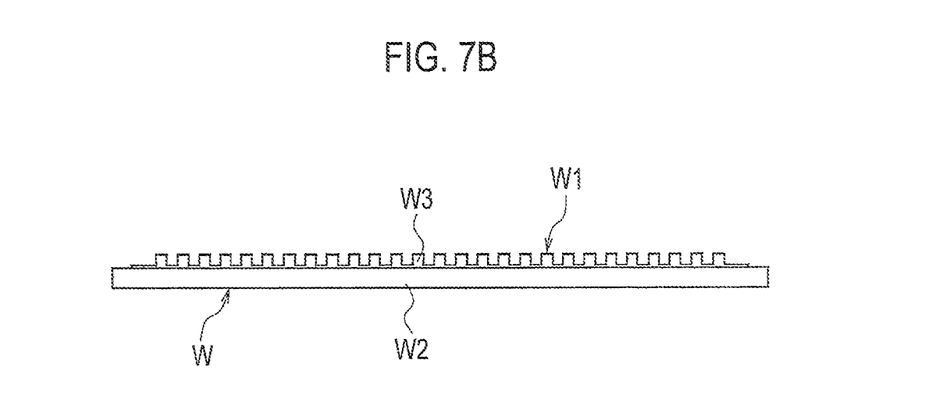

The transfer device 1 produces the molded material W provided with a fine transfer pattern W1 (refer to FIG. 7B). The molded material W is used for, for example, optical elements such as light guide panels and optical filters.

In the following explanations, for reasons of convenience, the two horizontal directions perpendicular to each other are defined as an X axis direction and a Y axis direction, and a direction vertical to both of the X axis direction and the Y axis direction is defined as a Z axis direction.

The transfer pattern M1 has a corrugated structure with a pitch and height similar to, for example, the wavelength of visible light. The transfer pattern M1 of the mold M is transferred to the molded material W formed as an inverted transfer pattern W1 (refer to FIGS. 7A and 7B).

The sheet-like mold M is composed of a sheet-like substrate (a mold substrate) M2 and a transfer pattern formation material M3. The transfer pattern M1 as described above is formed on the transfer pattern formation material M3.

The mold M has flexibility. Although the mold M is a rigid body and is hardly elastically deformed even if a tensile force is applied thereto in the direction perpendicular to the thickness direction of the mold M, the mold M is deformable to curl up in the thickness direction in a manner similar to paper currency. In other words, the mold M is deformable by the moment around the axis extending in a direction perpendicular to the thickness direction. Therefore, the mold M is easily wound on the peripheries of the rollers 5 and 7 in a state where the thickness direction corresponds to the radial direction of the respective rollers 5 and 7.

The mold substrate M2 is formed into a sheet-like (plate-like) shape made from, for example, an ultraviolet-transmitting resin material such as PET resin.

The transfer pattern formation material M3 is a thin film made of resin. This resin is ultraviolet-transmitting resin, such as ultraviolet curable resin, thermoset resin and thermoplastic resin. The transfer pattern formation material M3 is integrally formed on one surface of the mold substrate M2 in the thickness direction in a state where the thickness direction of the transfer pattern formation material M3 corresponds to that of the mold substrate M2.

The transfer pattern M1 is formed on one surface of the transfer pattern formation material M3 in the thickness direction, the one surface being the surface not in contact with the mold substrate M2. The transfer pattern M1 is formed by a process where a fine transfer pattern (not shown in the figures) formed on a master mold (not shown in the figure) is transferred thereto.

The mold substrate M2 is formed into, for example, a long rectangular plate-like (band plate) shape. The dimension in the width direction of the mold substrate M2 (the width similar to the conventional mold 323; the dimension in the Y axis direction) is much greater than the dimension in the thickness direction of the mold substrate M2. The dimension in the longitudinal direction of the mold substrate M2 (the dimension in the X axis direction) is much greater than the dimension in the width direction of the mold substrate M2.

The transfer pattern formation material M3 is also formed into, for example, a rectangular plate-like shape. The transfer pattern formation material M3 is provided on the mold substrate M2 in a manner such that the width direction and the longitudinal direction of the transfer pattern formation material M3 correspond to those of the mold substrate M2.

The plural transfer pattern formation materials M3 are intermittently provided on the mold substrate M2 at predetermined intervals in the longitudinal direction of the mold substrate M2. Alternatively, the transfer pattern formation materials M3 may be provided sequentially in the longitudinal direction of the mold substrate M2. The width of each of the transfer pattern formation materials M3 is smaller than that of the mold substrate M2.

The mold substrate M2 includes areas where the transfer pattern formation materials M3 are not provided. The areas extend sequentially in the longitudinal direction of the mold substrate M2. These areas are provided, for example, in the case where each of the transfer pattern formation materials M3 is smaller in width than the mold substrate M2. In such a case, the areas are provided as M4 where only the mold substrate M2 is provided on both sides in the width direction of the mold M (the mold substrate M2) (refer to FIG. 2).

The holding body 3 holds the molded material W.

The molded material W includes a substrate (a molded material substrate) W2 and a molded product W3.

The molded material substrate W2 is formed into, for example, a rectangular plate-like (sheet-like) shape made of a resin material such as PET resin. The molded product W3 is a thin film made of resin such as ultraviolet curable resin, thermoset resin or thermoplastic resin.

The molded material substrate W2 has substantially the same width as the mold substrate M2. The molded material substrate W2 is slightly longer than each transfer pattern formation material M3 intermittently provided on the sheet-like mold substrate M2.

The molded product W3 is also formed into a rectangular plate-like shape. The molded product W3 is provided on one surface in the thickness direction of the molded material substrate W2 in a state where the thickness direction (the Z axis direction) of the molded product W3 corresponds to that of the molded material substrate W2. The width direction (the Y axis direction) of the molded product W3 corresponds to that of the molded material substrate W2. The longitudinal direction of the molded product W3 corresponds to that (the X axis direction) of the molded material substrate W2. The molded product W3 has substantially the same width as the molded material substrate W2. The molded product W3 has substantially the same length as each transfer pattern formation material M3 intermittently provided on the sheet-like mold substrate M2.

The transfer pattern W1 is formed on one surface in the thickness direction of the molded product W3, the one surface being the surface not in contact with the molded material substrate W2.

In the case where the molded product W3 is ultraviolet curable resin or thermoset resin, the molded product W3 before the transfer of the transfer pattern M1 is not in a cured state but in a liquid or fluid state. The molded product W3 is completely cured once the transfer is finished.

The holding body 3 is formed into, for example, a rectangular plate-like shape. The holding body 3 has a flat surface (one surface in the thickness direction; the upper surface; the molded material mounting surface) 9 to hold the molded material W. The rear surface of the molded material W entirely comes into contact with the mounting surface 9 of the holding body 3, and is held by the holding body 3 by means of, for example, vacuum suction. Note that the rear surface represents that which is not the surface on which the molded product W3 is provided.

The width direction and the longitudinal direction of the molded material W mounted on the holding body 3, correspond to the width direction (the Y axis direction) and the longitudinal direction (the X axis direction) of the holding body 3, respectively.

The first roller 5 is formed into a cylindrical shape, and the mold M is wound on the periphery of the first roller 5. The wound mold M and the molded material W held by the holding body 3 are inserted and held between the first roller 5 and the holding body 3 in the Z axis direction for the pattern transfer.

The first roller 5 rotates about its central axis C1 extending in the Y axis direction and moves in the X axis direction with respect to the holding body 3. The mold M and the molded material W held between the first roller 5 and the holding body 3 move in association with the movement of the first roller 5.

The second roller 7 is also formed into a cylindrical shape, and the mold M is wound on the periphery of the second roller 7, as in the case of the first roller 5. The second roller 7 is separated from the holding body 3, for example, in the Z axis direction away from the first roller 5. The mold M is wound on the periphery of the second roller 7 in the direction opposite to the direction in which the mold M is wound on the first roller 5. Namely, the mold M is wound around the first roller 5 on the molded material W side and extends from the first roller 5, and is then wound around the second roller 7 on the side away from the molded material W held by the holding body 3.

The second roller 7 rotates about its central axis C2 parallel to the central axis C1 of the first roller 5 in synchronization with the rotation of the first roller 5. The second roller 7 moves with respect to the holding body 3 together with the first roller 5.

The first roller 5 has substantially the same outer diameter as the second roller 7. The first roller 5 has substantially the same length as the second roller 7.

The width of the first roller 5 (length in the Y axis direction) is slightly larger than the width of the molded material W held by the holding body 3. The extending direction (the width direction) of the central axis C1 of the first roller 5 corresponds to the width direction of the molded material W held by the holding body 3. The center in the width direction of the first roller 5 corresponds to the center in the width direction of the molded material W held by the holding body 3.

The first roller 5 is movable to be placed in any position in the direction perpendicular to the mounting surface 9 of the holding body 3 (in the Z axis direction).

When the mold M and the molded material W held by the holding body 3 are inserted and held between the first roller 5 and the holding body 3, the distance between the central axis C1 of the first roller 5 and the mounting surface 9 is substantially the same as, or slightly smaller than the sum of the radius of the first roller 5, the thickness of the mold M and the thickness of the molded material W. Thus, the mold M and the molded material W can be held between the first roller 5 and the holding body 3.

The width direction of the mold M wound on the first roller 5 corresponds to the width direction of the first roller 5. The center in the width direction of the mold M wound on the first roller 5 substantially corresponds to the center in the width direction of the first roller 5. The mold M is wound halfway around the first roller 5.

The rear surface of the mold substrate M2 of the mold M wound on the first roller 5 is in contact with the outer surface of the first roller 5. Note that the rear surface of the mold substrate M2 represents that which is not the surface on which the transfer pattern formation material M3 is provided.

The mold M is wound on the first roller 5 and held between the first roller 5 and the holding body 3, and extends towards the other end of the holding body 3 in the longitudinal direction (in the X axis direction) parallel to the mounting surface 9. In the state where the mold M extends forward (in the X axis direction) between the first roller 5 and the holding body 3, the mold M is separated from the mounting surface 9 by the thickness of the molded material W.

The center in the width direction of the first roller 5 corresponds to the center in the width direction of the second roller 7. The second roller 7 is located on the opposite side from the holding body 3, for example, in the state where the first roller 5 is interposed therebetween. The first roller 5 and the second roller 7 overlap each other when viewed from the direction perpendicular to the mounting surface 9 (the Z axis direction).

The mold M is wound on the first roller 5, and further wound halfway around the second roller 7 in the direction opposite to the direction in which the mold M is wound on the first roller 5. When viewed from the extending direction of the central axes C1 and C2 of the respective rollers 5 and 7, the mold M wound on the respective rollers 5 and 7 forms an S-shape or an inverted S-shape. The first roller 5 and the second roller 7 hold the mold M therebetween.

The central axis C2 of the second roller 7 is located to be a predetermined distance from the central axis C1 of the first roller 5. The second roller 7 is configured to be movable to be placed in any position, in association with the first roller 5, in the direction perpendicular to the mounting surface 9 of the holding body 3 (in the Z axis direction).

The mold M extends towards one side in the X axis direction (in FIG. 1, towards the left) from the top of the second roller 7. The mold M also extends towards the other side in the X axis direction (in FIG. 1, towards the right) from the bottom of the first roller 5. The extending directions of the mold M described above are parallel to each other. In other words, the longitudinal direction of the mold M extending from the first roller 5 corresponds to the longitudinal direction of the mold M extending from the second roller 7. Further, the thickness direction of the mold M extending from the first roller 5 corresponds to the thickness direction of the mold M extending from the second roller 7.

The distance between the mold M extending from the top of the second roller 7 and the holding body 3 in the Z axis direction, is slightly greater than the sum of the diameter of the first roller 5 and the diameter of the second roller 7.

Figure 5:
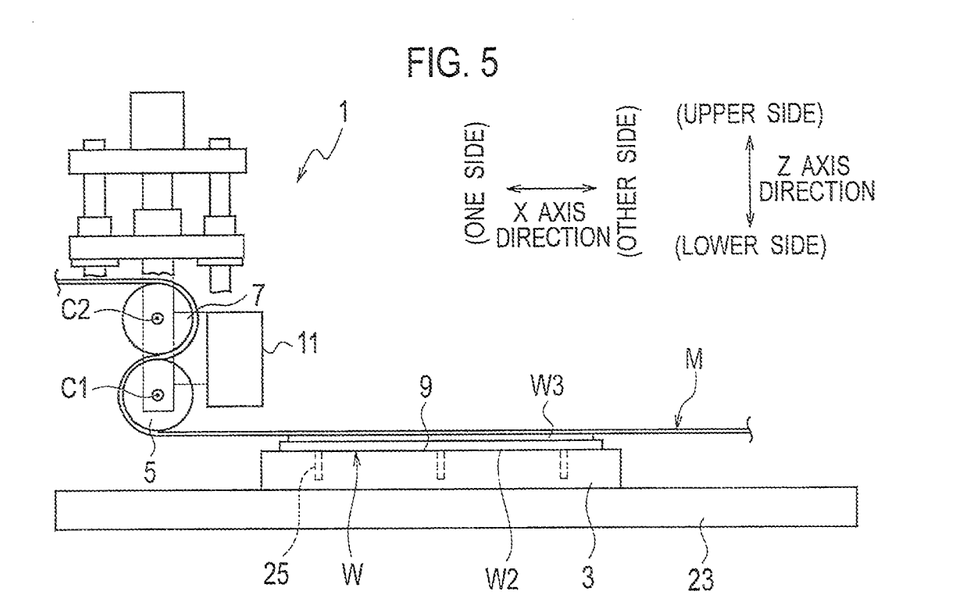
FIG. 5 shows the operation of the transfer device according to the embodiment of the present invention.

The respective rollers 5 and 7 are configured to be movable with respect to the holding body 3 in the longitudinal direction of the molded material W (in the X axis direction). That is, the respective rollers 5 and 7 move between the position slightly separated from one end of the holding body 3 (refer to FIG. 5) and the position slightly separated from the other end of the holding body 3 (refer to FIG. 3), in the longitudinal direction of the holding body 3.

Figure 3:
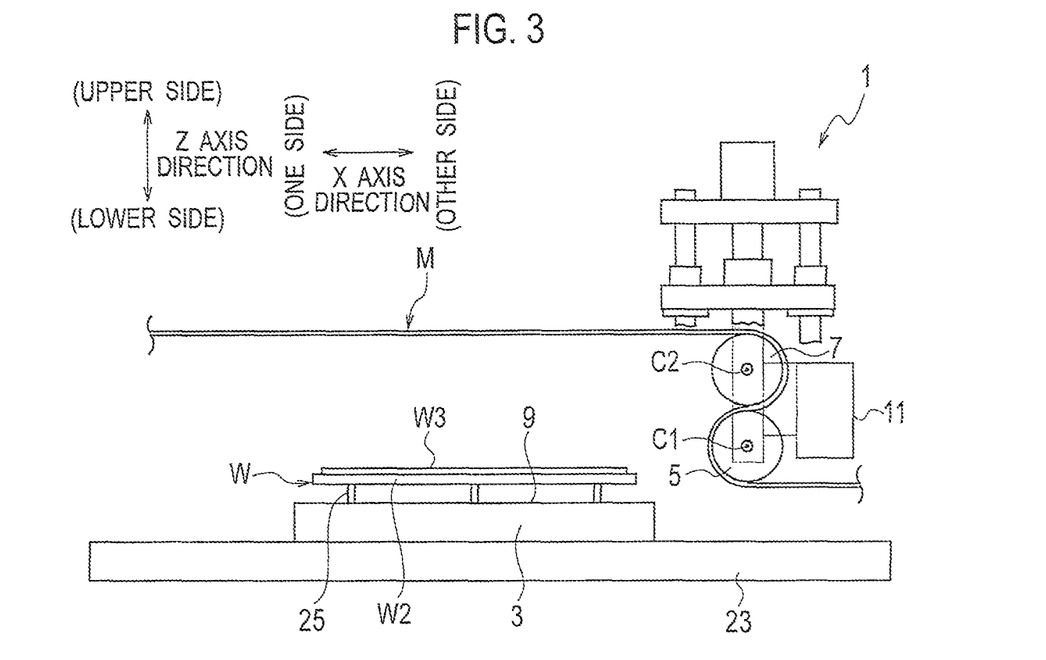
FIG. 3 shows the operation of the transfer device according to the embodiment of the present invention.

In the initial state shown in FIG. 3, (i) the molded material W is placed on the holding body 3, (ii) the mold M is wound on the respective rollers 5 and 7, (iii) the first roller 5 is separated from the mounting surface 9 approximately by the distance corresponding to the sum of the thickness of the molded material W and the thickness of the mold M (by the distance required for the transfer) in the direction perpendicular to the mounting surface 9, and (iv) the respective rollers 5 and 7 are located at the position slightly separated from the other end of the holding body 3 in the longitudinal direction. In the initial state, the mold M extending from the second roller 7 is located immediately above the holding body 3 whereas the mold M extending from the first roller 5 is separated from the holding body 3.

Namely, when viewing the initial state in the direction perpendicular to the mounting surface 9 (in the Z axis direction), the part of the mold M extending towards the left from the top of the second roller 7 in FIG. 3 overlaps the mounting surface 9, and the part of the mold M extending from the bottom of the first roller 5 is separated from the mounting surface 9 towards the right.

Figure 4:
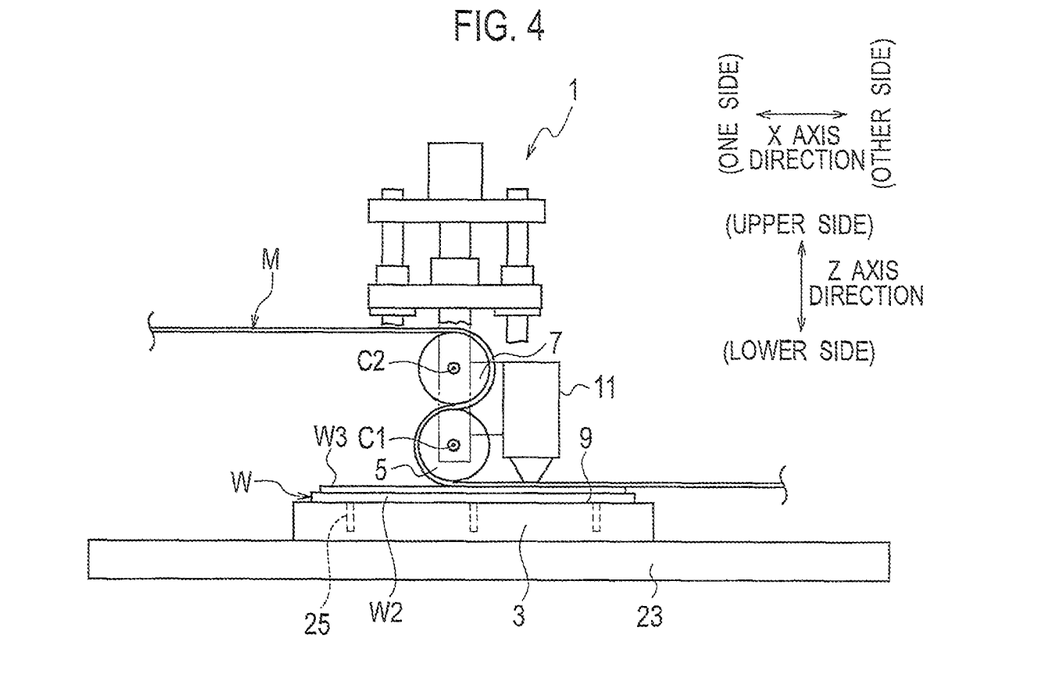
FIG. 4 shows the operation of the transfer device according to the embodiment of the present invention.

When the respective rollers 5 and 7 move to one side in the longitudinal direction of the holding body 3 (towards the left in FIG. 3) from the initial state shown in FIG. 3, the mold M and the molded material W held between the first roller 5 and the holding body 3 (the linear part extending in the width direction of the holding body 3) also move (refer to FIG. 4). Note that, at this point, the mold M does not slip on the respective rollers 5 and 7 and the molded material W. The first roller 5 and the molded material W on the holding body 3 forms a rolling pair while interposing the mold M therebetween.

In the case where the molded product W3 of the molded material W is ultraviolet curable resin, the transfer device 1 is provided with an ultraviolet ray generation unit 11 to cure the molded product W3. The ultraviolet ray generation unit 11 is moved and positioned together with the respective rollers 5 and 7. The ultraviolet ray generation unit 11 irradiates the area where the molded material W and the mold M are held between the first roller 5 and the holding body 3, with ultraviolet rays to cure the molded product W3 of the molded material W. With this curing, a counter shape to the fine transfer pattern M1 of the mold M is formed on the molded material W.

Namely, when the respective rollers 5 and 7 are moving in the X axis direction, the ultraviolet ray generation unit 11 performs the irradiation at the rear side of the respective rollers 5 and 7 (on the other side of the holding body 3 in the longitudinal direction). The molded product W3 of the molded material W is irradiated with the ultraviolet rays through the mold M. Due to the irradiation with the ultraviolet rays, the molded product W3 is cured. In FIG. 4, the molded product W3 is cured sequentially from the right to the left.

Figure 6:
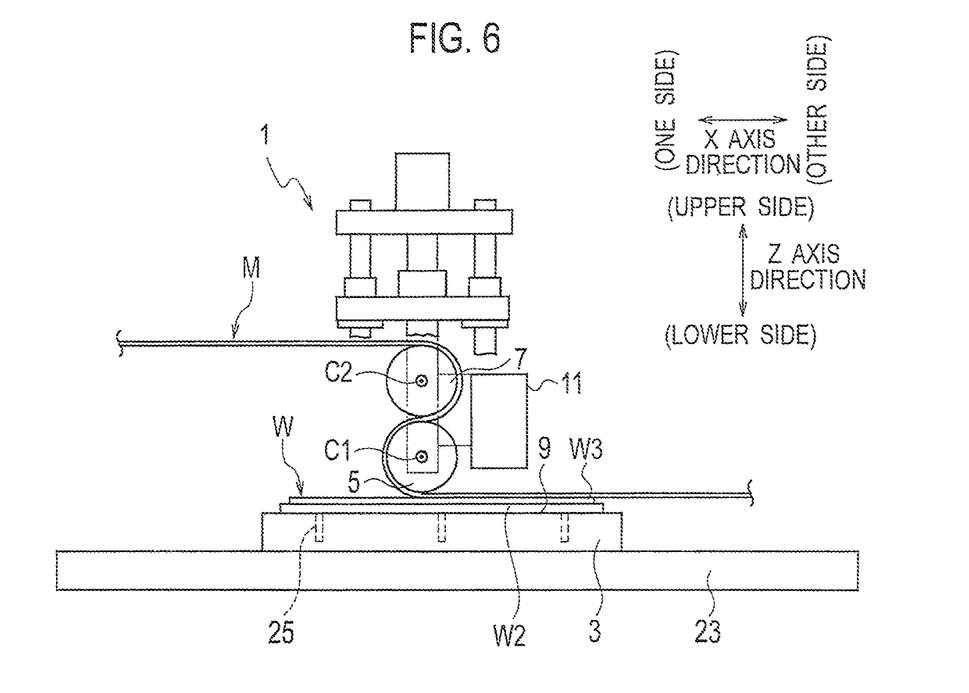
FIG. 6 shows the operation of the transfer device according to the embodiment of the present invention.

When the respective rollers 5 and 7 reach one end of the holding body 3 in the longitudinal direction (refer to FIG. 5), the molded product W3 has been cured, while the mold M stays adhered to the molded material W. The respective rollers 5 and 7 then move to the opposite side in the X axis direction (the other end of the holding body 3; towards the right), and the mold M adhered to the molded material W starts to come off the molded material W (refer to FIG. 6). The respective rollers 5 and 7 further move towards the right from the position shown in FIG. 6 to the position shown in FIG. 3, thereby completing the separation of the molded material W from the mold M.

The transfer device 1 includes a master mold placement unit 13 and a mold winding unit 15. A master mold 17 is attached to the master mold placement unit 13. The master mold 17 is a roll of the mold M having not yet been used for transfer (namely, a blank mold). The mold winding unit 15 winds up the master mold 17 drawn from the master mold placement unit 13. Namely, the mold winding unit 15 winds up the used mold M to collect it as a wound roll 19.

The mold M is stretched out in a sheet-like (plate-like) state at a predetermined tension between the master mold placement unit 13 and the mold winding unit 15 while being wound on the respective rollers 5 and 7.

The predetermined tension is applied to the sheet-like mold M in a plate-like state in the longitudinal direction (for example, in the horizontal direction connecting the master mold placement unit and the mold winding unit; the X axis direction). This tension keeps the mold M in the plate-like state. Here, the fine transfer pattern M1 is provided on the lower surface of the sheet-like mold M, although not shown in FIG. 2 to FIG. 6 (refer to FIG. 1).

As described above, the master mold 17 is a roll of the mold M having not yet been used for transfer. The master mold 17 is formed into a cylindrical shape or a column in a manner such that the sheet-like mold M is wound on the circumference of a cylindrical core material in a state where the circumferential direction of the core material corresponds to the longitudinal direction of the sheet-like mold M.

Once the mold M is used for the transfer, the mold M is rolled up by the mold winding unit 15 to form the wound roll 19 similar to the master mold 17.

The master mold 17 rotates about its central axis (for example, an axis extending in the horizontal direction; an axis extending in the Y axis direction) C3. The wound roll 19 also rotates about its central axis (an axis extending in the Y axis direction) C4.

Figure 2:
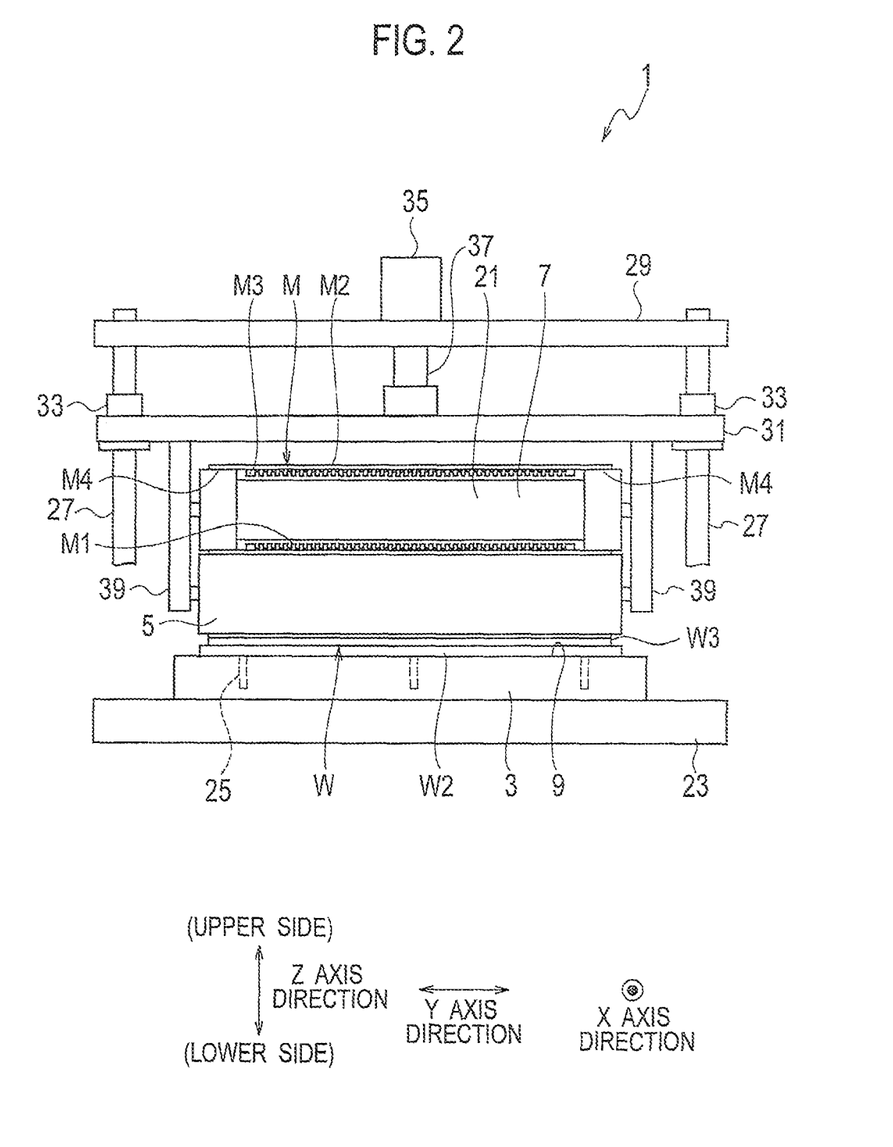
FIG. 2 is a view from the arrows denoted by II-II in FIG. 1.

As shown in FIG. 2, the second roller 7 includes a small diameter portion 21 to avoid contact with the fine transfer pattern M1 of the wound mold M.

The small diameter portion 21 is provided in the middle of the second roller 7 in the width direction, and the diameter thereof is smaller than that on each side of the second roller 7 in the width direction where the small diameter portion 21 not provided. When the mold M is wound on the second roller 7, end portions M4 of the mold M come into contact with both sides of the second roller 7. At this point, the transfer pattern formation material M3 of the mold M is located at the position corresponding to the small diameter portion 21, and is slightly separated from the second roller 7.

As described above, the mold M extends from the respective rollers 5 and 7 parallel to the surface 9 on which the molded material W is provided.

The transfer device 1 is explained in more detail below.

The transfer device 1 includes a vibration isolator 23. The holding body 3 is located on and integrated with the vibration isolator 23.

The holding body 3 is provided with lift pins 25. The lift pins 25 are moved in the Z axis direction by an actuator (not shown in the figures) such as a pneumatic cylinder. The actuator is controlled by a controller (not shown in the figures) including a CPU.

The lift pins 25 are moved downward in a manner as to be placed under the surface of the holding body 3, and the lift pins 25 are moved upward in a manner as to protrude upward from the mounting surface 9 of the holding body 3.

The transfer device 1 is provided with pillars 27, a lower pillar support body (not shown in the figures), and an upper pillar support body 29 located above the vibration isolator 23. The pillars 27, the lower pillar support body and the upper pillar support body 27 are integrated together, and supported by the vibration isolator 23 via a linear guide bearing (not shown in the figures) in a manner as to be movable in the X axis direction on the vibration isolator 23.

The lower pillar support body (pillars 27 and upper pillar support body 29) is moved and positioned in the X axis direction on the vibration isolator 23 (the holding body 3) by an actuator (not shown in the figures) such as a servomotor or a ball screw (not shown in the figures) controlled by the controller (not shown in the figures).

A movable body 31 is supported by the pillars 27 via linear guide bearings 33. The movable body 31 is moved along the pillars 27 in the Z axis direction. The movable body 31 is moved and positioned in the Z axis direction along the pillars 27 (on the vibration isolator 23, the holding body 3) by an actuator such as a servomotor 35 and a ball screw 37 controlled by the controller.

The movable body 31 is provided and integrated with a roller support body 39. The roller support body 39 rotatably supports the respective rollers 5 and 7. The respective rollers 5 and 7 are thus movable to be placed in any position in the X axis direction and Z axis direction on the holding body 3.

The respective rollers 5 and 7 rotate by way of an actuator (not shown in the figures) such as a servomotor. Alternatively, the respective rollers 5 and 7 may be rotatably supported by the roller support body 39. In such a case, the respective rollers 5 and 7 are not necessarily supplied with drive force for the rotation.

The roller support body 39 is provided and integrated with the ultraviolet ray generation unit 11.

The transfer device 1 may move and position the holding body 3 on the vibration isolator 23, instead of moving and positioning the lower pillar support body (the pillars 27, the upper pillar support body 29). Alternatively, the transfer device 1 may move and position the holding body 3 on the vibration isolator 23, in addition to moving and positioning the lower pillar support body (the pillars 27, the upper pillar support body 29).

The master mold placement unit 13 and the mold winding unit 15 are provided in the vibration isolator 23. Guide rollers 41A to 41D are provided between the master mold placement unit 13 and the second roller 7. The mold M is wound on the respective guide rollers 41A to 41D. The guide roller 41B is a dancer roller to be moved and positioned in the Z axis direction. The guide rollers 41C and 41D are positioned in a manner such that the mold M extends horizontally from the guide roller 41C and 41D to the second roller 7. For example, the guide rollers 41C and 41D are movable to be placed in any position in the Z axis direction depending on the movement and positioning of the second roller 7 in the Z axis direction.

A guide roller 43 is provided between the first roller 5 and the mold winding unit 15. The guide roller 43 is movable to be placed in any position in the Z axis direction. The guide roller 43 is positioned in a manner such that the mold M extends horizontally from the first roller 5 to the guide roller 43.

The operation of the transfer device is explained below.

First, the respective rollers 5 and 7 are placed in the position shown in FIG. 3. The lift pins 25 are kept protruding upward. The molded material W is mounted on the lifted lift pins 25.

Next, the lift pins 25 are moved downward by the controller. The holding body 3 holds the molded material W.

Next, the respective rollers 5 and 7 move towards one end in the longitudinal direction of the support body 3 (towards the left in FIG. 3). The mold M and the molded material W held between the first roller 5 and the holding body 3 also move from the right to the left in FIG. 3 in association with the movement of the respective rollers 5 and 7 (refer to FIG. 4).

The ultraviolet ray generation unit 11 irradiates, with ultraviolet rays, the area where the molded material W and the mold M are held between the first roller 5 and the holding body 3, so as to cure the molded product W3 of the molded material W.

The respective rollers 5 and 7 reach one end in the longitudinal direction of the holding body 3. At this point, the molded product W3 has been cured, and the mold M stays adhered to the molded material W. The respective rollers 5 and 7 then move in the opposite direction so as to remove the mold M adhered to the molded material W (refer to FIG. 6). Subsequently, the lift pins 25 are lifted up to convey the molded material W.

According to the transfer device 1 of the present embodiment, it is only required to synchronize the movement and the rotation of the respective rollers 5 and 7 at the point of transfer. However, it is not required to synchronize the rotation of the respective rollers 5 and 7 if the respective rollers 5 and 7 can rotate freely and independently from each other. This eliminates the complicated synchronizing process, which is required in the conventional case, thereby simplifying the control operation of the transfer device 1.

Further, since the transfer device 1 includes the master mold placement unit 13 and the mold winding unit 15, the exchange of the mold M can be carried out easily and accurately.

The mold M is poor in durability. Thus, in the conventional case, the mold M is required to be changed every time or after a few cycles of transfer. The molded material 309 as shown in FIG. 13 usually has a length (a dimension in the right-left direction in FIG. 13) and a width (a dimension in the direction perpendicular to the plane of paper of FIG. 13) that are approximately from 1 m (1000 mm) to 1.5 m. The dimension of the mold 323 increases as the dimension of the molded material 309 increases.

In addition, in the transfer device 301 shown in FIG. 13, the mold 323 is required to be removed from the transfer device 301 to be replaced with a new one every time or after a few cycles of transfer. However, the mold 323 is not easy to handle because it is large in size. Moreover, it is difficult to place the mold 323 precisely on the transfer device 301. For example, the mold 323 is often bent at the time of attaching to the chucks 319 and 321.

In contrast, due to the master mold placement unit 13 and mold winding unit 15, the transfer device 1 of the present embodiment is only required to wind up a predetermined length of the mold M by the mold winding unit 15, and pull out a new part of the mold M (having not been used for the transfer yet) from the master mold placement unit 13. This eliminates the process of removing the mold M from the transfer device 1 each time and replacing with a new one, and also contributes to easy and accurate exchange of the mold M.

In the transfer device 1, the mold M can be exchange smoothly and rapidly. Therefore, the exchange time of the mold M, which is required for the transfer device 301, can be used for the transfer to the molded material W. This contributes to an increase in efficiency of the transfer.

The second roller 7 includes the small diameter portion 21 to avoid contact with the fine transfer pattern M1 of the wound mold M. This prevents the fine transfer pattern M1 from being flattened by tension of the mold M.

The first roller 5 and the second roller 7 interpose the mold M therebetween. Therefore, the second roller 7 can serve as a backup roller for the first roller 5. That is, at the point of transfer, deformation of the first roller 5 caused by a reaction force mainly applied from the molded material W, can be minimized.

The mold M is wound on the respective rollers 5 and 7 and extends therefrom in parallel with the mounting surface 9. This eliminates the process of adjusting the length of the mold M extending from the master mold placement unit 13 to the mold winding unit 15, and also contributes to simplification of the configuration of the transfer device 1.

In the conventional transfer device 301, the adhering angle changes as the position of the roller 311A changes. Note that the adhering angle represents an angle of the mold inclined to the molded material, that is, an angle formed by the intersection of the molded material 309 and the mold obliquely extending from the roller 311A to the second chuck 321, as shown in FIG. 13. In contrast, in the transfer device 1 of the present embodiment, the adhering angle can be kept constant regardless of the position of the rollers 5 and 7 so as to perform the transfer more evenly.

The following is an explanation of a transfer device 1a according to a modified example.

Figure 8:
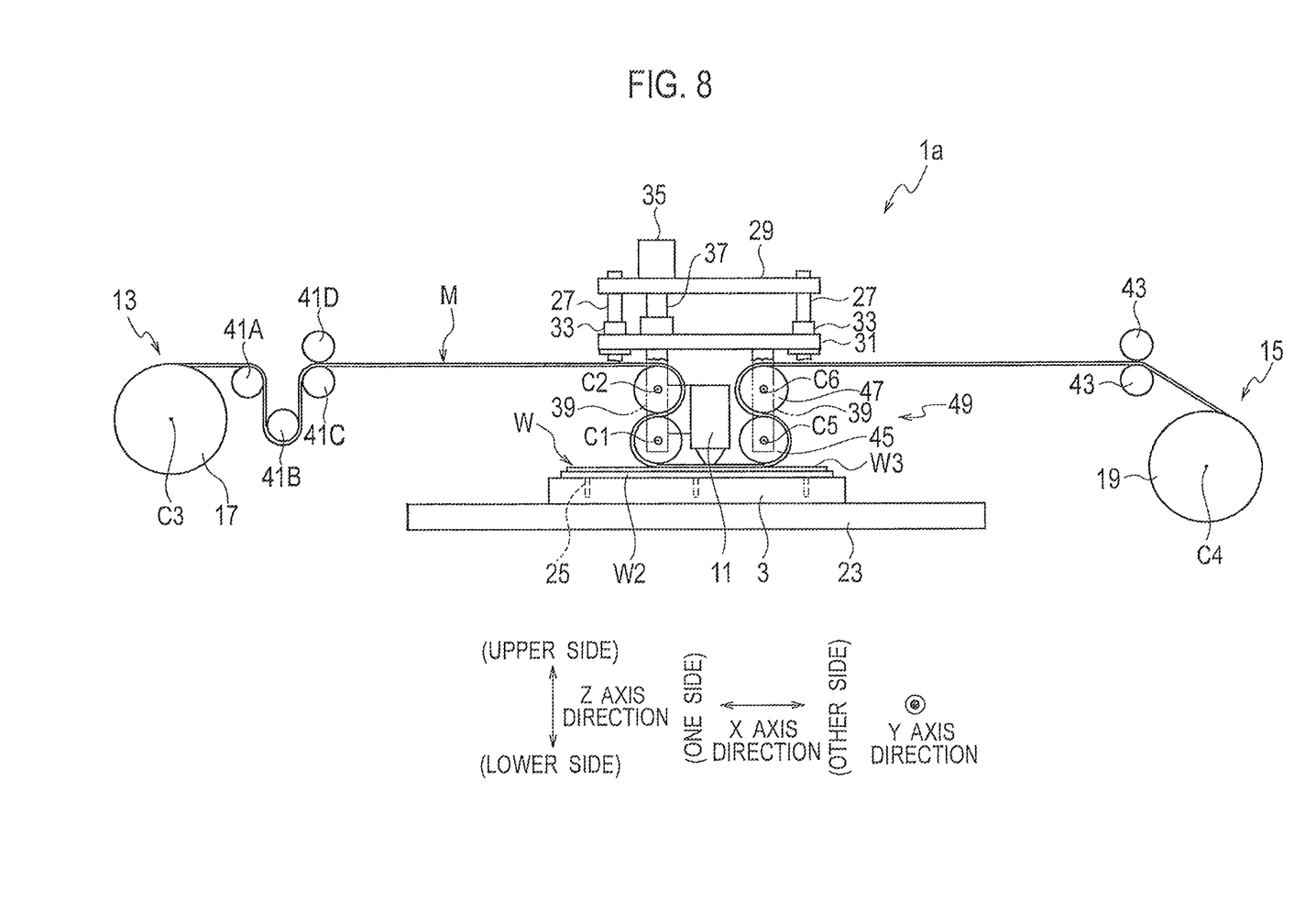
FIG. 8 shows a schematic configuration of a transfer device according to a modified example.

As shown in FIG. 8, the transfer device 1a according to the modified example differs from the transfer device 1 shown in FIG. 1 in that a third roller 45 and a fourth roller 47 are further provided therein to remove the mold M from the molded material W. The other configurations are the same as the transfer device 1 shown in FIG. 1.

The transfer device 1a further includes a removing unit 49 consisting of the third roller 45 and the fourth roller 47, in addition to the first roller 5 and the second roller 7.

The mold M is wound on the third roller 45 and the fourth roller 47 in the same manner as it is wound on the first roller 5 and the second roller 7. The third roller 45 and the fourth roller 47 move together with the first roller 5 and the second roller 7. Due to this movement, the mold M adhered to the molded material W by the transfer can be removed from the molded material W immediately after the transfer.

The mold M extends in the longitudinal direction and is sequentially wound on the second roller 7, the first roller 5, the third roller 45 and the fourth roller 47.

The third roller 45 is located towards the mold winding unit 15 on the opposite side of the first roller 5. The third roller 45 takes up the mold M wound on the first roller 5 and adhered to the molded material W.

The third roller 45 rotates about a central axis C5 parallel to the central axis C1 of the first roller 5 in synchronization with the rotation of the first roller 5 by way of an actuator (not shown in the figure) such as a servomotor. The third roller 45 moves together with the first roller 5 with respect to the holding body 3 so as to take up the mold M to separate it from the molded material W. Note that the third roller 45 need not receive drive force from the actuator. In such a case, the third roller 45 rotates freely and independently from the first roller 5 when the mold M is not wound thereon.

In other words, the third roller 45 also holds, together with the holding body 3, the mold M and the molded material W held by the holding body 3 as in the case of the first roller 5.

The fourth roller 47 is, for example, separated from the holding body 3 with the third roller 45 interposed therebetween. The mold M is wound on the third roller 45, extends from the third roller 45 in the direction opposite to the first roller 5, and is further wound on the fourth roller 47 in the direction opposite to the direction in which the mold M is wound on the third roller 45. Namely, the mold M is wound around the fourth roller 47 on the side away from the molded material W held by the holding body 3.

The fourth roller 47 rotates about a central axis C6 parallel to the central axis C5 of the third roller 45 in synchronization with the rotation of the third roller 45 by way of an actuator (not shown in the figure) such as a servomotor. The fourth roller 47 moves together with the third roller 45 with respect to the holding body 3. Note that the fourth roller 47 need not receive drive force from the actuator. In such a case, the fourth roller 47 rotates freely and independently from the third roller 45 when the mold M is not wound thereon.

The outer diameter of each of the third roller 45 and the fourth roller 47 is substantially the same as that of the first roller 5. The length (the width) of each of the third roller 45 and the fourth roller 47 is substantially the same as the length (the width) of the first roller 5.

The first roller 5, the third roller 45 and the fourth roller 47 are each located in a manner such that the positions of the respective adjacent rollers correspond to each other in the width direction (in the Y axis direction).

The mold M is wound halfway around the third roller 45 as in the case of the first roller 5.

The rear surface of the mold substrate M2 is in contact with the outer surface of the third roller 45 as in the case of the first roller 5.

The fourth roller 47 is located on the opposite side from the holding body 3 with the third roller 45 interposed therebetween. When viewed from the direction perpendicular to the mounting surface 9 (the Z axis direction), the third roller 45 and the fourth roller 47 overlap each other.

The mold M is wound on the third roller 45 and extends therefrom. The mold M is further wound halfway around the fourth roller 47 in the direction opposite to the direction in which the mold M is wound on the third roller 45. When viewed from the extending direction of the central axes C5 and C6 of the third roller 45 and the fourth roller 47, the mold M wound on the third roller 45 and the fourth roller 47 forms an S-shape or an inverted S-shape, as in the case of the first roller 5 and the second roller 7.

The central axis C5 of the third roller 45 and the central axis C6 of the fourth roller 47 are each a constant distance from the central axis C1 of the first roller 5. The central axis C5 and the central axis C6 are supported by the roller support body 39 integrally provided on the movable body 31. Accordingly, the third roller 45 and the fourth roller 47 are movable to be placed in any position in the direction perpendicular to the mounting surface 9 of the holding body 3 (in the Z axis direction).

The mold M extends from the top of the fourth roller 47 towards one side in the X axis direction (towards the right in FIG. 8). The mold M also extends from the bottom of the third roller 45 towards the other side in the X axis direction (towards the left in FIG. 8). The extending directions of the mold M described above are parallel to each other.

The distance between the mold M extending from the top of the fourth roller 47 and the holding body 3 in the Z axis direction, is slightly greater than the sum of the diameter of the third roller 45 and the diameter of the fourth roller 47.

The third roller 45 and the fourth roller 47 are supported by the roller support body 39 integrally provided on the movable body 31. This allows the first roller 5, the second roller 7, the third roller 45 and the fourth roller 47 to be movable with respect to the holding body 3 in the X axis direction. The fourth roller 47 is also provided with the small diameter portion 21 as in the case of the second roller 7.

The operation of the transfer device 1a is explained below.

Figure 9:
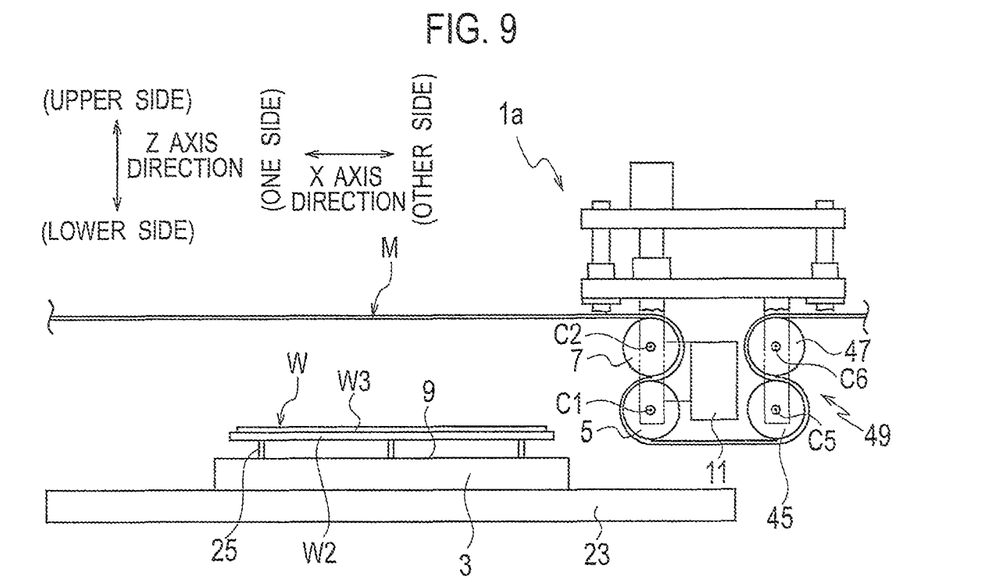
FIG. 9 shows the operation of the transfer device according to the modified example.

In the initial state, first, the respective rollers 5, 7, 45 and 47 are each placed in the position shown in FIG. 9. The lift pins 25 are kept protruding upward. The molded material W is mounted on the lifted lift pins 25.

Next, the lift pins 25 are moved downward by the controller. The holding body 3 holds the molded material W.

Next, the respective rollers 5, 7, 45 and 47 move towards one end in the longitudinal direction of the support body 3 (towards the left in FIG. 9). In association with this movement, the mold M and the molded material W held between the first roller 5 and the holding body 3 also move from the right to the left in FIG. 9 (refer to FIG. 10).

Figure 10:
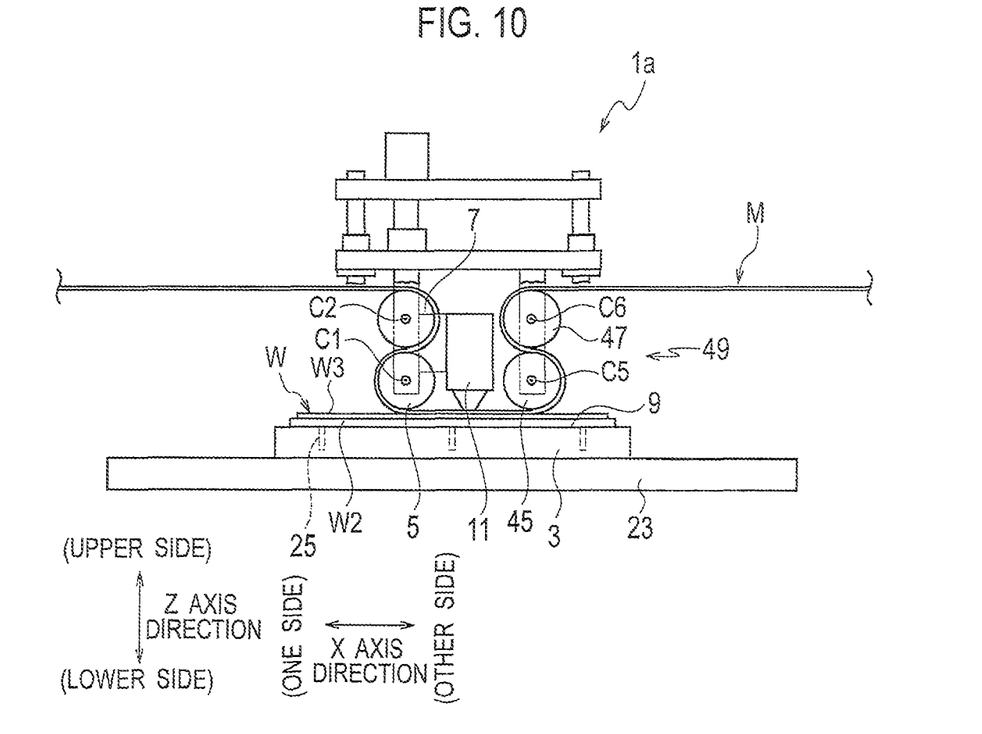
FIG. 10 shows the operation of the transfer device according to the modified example.

The ultraviolet ray generation unit 11 irradiates, with ultraviolet rays, the area where the molded material W and the mold M are held between the first roller 5 and the holding body 3, so as to cure the molded product W3 of the molded material W. After the molded product W3 is cured, the third roller 45 removes the mold M from the molded material W.

Figure 11:
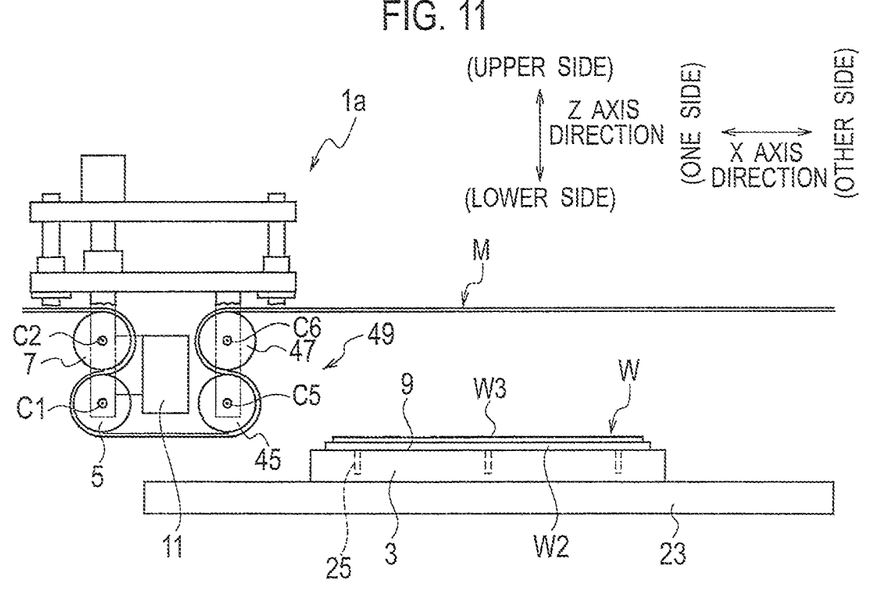
FIG. 11 shows the operation of the transfer device according to the modified example.
Figure 12:
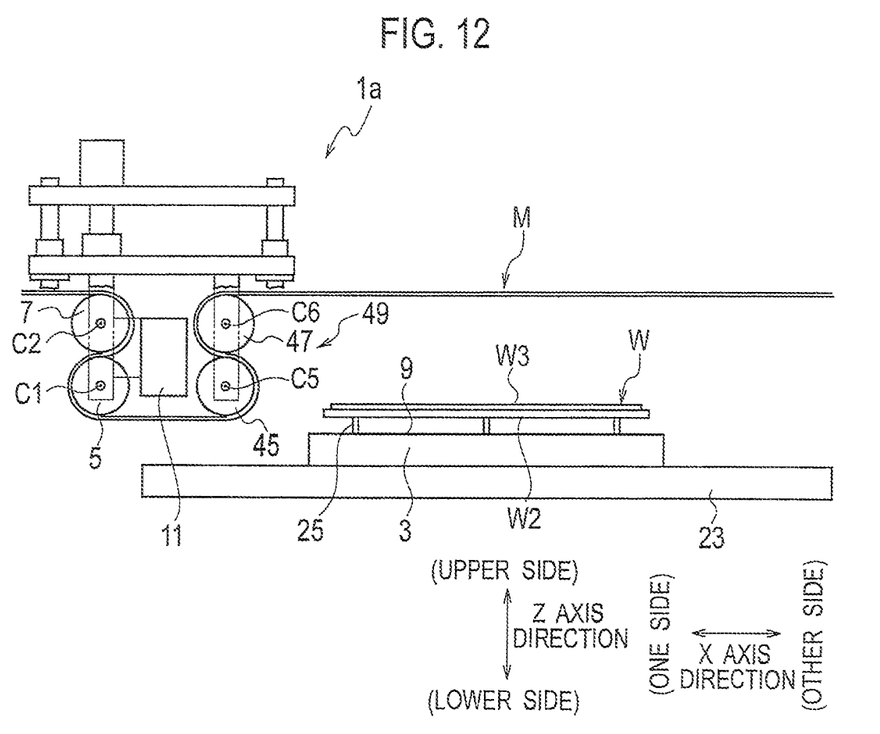
FIG. 12 shows the operation of the transfer device according to the modified example.

Subsequently, the respective rollers 5, 7, 45 and 47 reach one end in the longitudinal direction of the support body 3 (refer to FIG. 11). At this point, the transfer to the molded material W and the removal of the mold M from the molded material W are completed. The lift pins 25 are then lifted up (refer to FIG. 12) so as to convey the molded material W.

According to the transfer device 1a, the third roller 45 and the fourth roller 47 can remove the mold M from the molded material W. Accordingly, the transfer of the fine transfer pattern on the molded material W and the removal of the mold M from the molded material W can be carried out only by moving the respective rollers 5, 7, 45 and 47 in one direction from one side to the other side in the longitudinal direction of the holding body 3, which contributes to an increase in efficiency of the transfer.

What is claimed is:

1. A transfer device that transfers a fine transfer pattern formed on a sheet-like mold to a molded material, the transfer device comprising:
   a holding body that holds the molded material;
   a first roller on which the mold is wound, the first roller holding, together with the holding body, the mold and the molded material held by the holding body, and the first roller rotating about a central axis thereof to move with respect to the holding body in a moving direction to carry out a transfer of the transfer pattern on the mold to the molded material;
   a second roller on which, in the transfer, the mold extending from the first roller is wound in a direction away from the molded material held by the holding body, the second roller rotating about a central axis thereof to move with respect to the holding body together with the first roller, and a curing device configured to irradiate the molded material with light to cure the molded material, the curing device being disposed behind the first roller with respect to the moving direction of the first roller and being configured to move with the first and second rollers.

2. The transfer device according to claim 1, further comprising a master mold placement unit and a mold winding unit, wherein the mold wound on the respective rollers extends and is stretched out by a predetermined tension between a master mold placed on the master mold placement unit and the mold winding unit.

3. The transfer device according to claim 1, wherein the second roller is provided with a small diameter portion to avoid contact with the fine transfer pattern of the mold wound thereon.

4. The transfer device according to claim 1, wherein the mold wound on and extending from the respective rollers is parallel to a surface on which the molded material is provided.

5. The transfer device according to claim 1, further comprising a third roller and a fourth roller, wherein the mold is wound on the third roller and the fourth roller, and the third roller and the fourth roller move together with the first roller and the second roller to remove the mold from the molded material after the mold has been adhered to the molded material by the transfer.

6. The transfer device according to claim 2, wherein the second roller is provided with a small diameter portion to avoid contact with the fine transfer pattern of the mold wound thereon.

7. The transfer device according to claim 2, wherein the mold wound on and extending from the respective rollers is parallel to a surface on which the molded material is provided.

8. The transfer device according to claim 3, wherein the mold wound on and extending from the respective rollers is parallel to a surface on which the molded material is provided.

9. The transfer device according to claim 2, further comprising a third roller and a fourth roller, wherein the mold is wound on the third roller and the fourth roller, and the third roller and the fourth roller move together with the first roller and the second roller to remove the mold from the molded material after the mold has been adhered to the molded material by the transfer.

10. The transfer device according to claim 3, further comprising a third roller and a fourth roller, wherein the mold is wound on the third roller and the fourth roller, and the third roller and the fourth roller move together with the first roller and the second roller to remove the mold from the molded material after the mold has been adhered to the molded material by the transfer.

11. The transfer device according to claim 4, further comprising a third roller and a fourth roller, wherein the mold is wound on the third roller and the fourth roller, and the third roller and the fourth roller move together with the first roller and the second roller to remove the mold from the molded material after the mold has been adhered to the molded material by the transfer.

* * * * *